Patented May 3, 1949

2,469,228

UNITED STATES PATENT OFFICE 2,469,228

INSECT REPELLENT

Samuel I. Gertler, Washington, D. C., dedicated to the free use of the People in the territory of the United States No Drawing. Application February 18, 1946, Serial No. 648,551

1 Claim. (Cl. 167—30)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

I hereby dedicate the invention herein described to the free use of the people in the territory of the United States to take effect on the granting of a patent to me.

This invention relates to compositions which are useful for repelling insects, such as mosquitoes, flies, gnats, fleas and the like, and has among its objects the production of insect repellents having little or no odor, having no injurious effect on textiles, and which are substantially harmless to the animal body when contacted with the repellent.

I have found that compositions containing benzyl ether as their essential active ingredient are particularly valuable as repellents against the species of mosquito known as *Aedes aegypti*. This species is widely distributed and is a common carrier of yellow fever.

Benzyl ether has the following chemical formula:

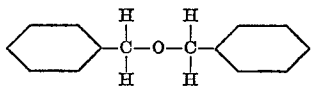

Pure benzyl ether is a relatively non-volatile liquid having a boiling point of 295° C. It has no objectionable odor and is non-irritating to the skin. It is colorless and also does not stain fabrics.

Various compositions containing this ether were tested against the species of mosquito named above, and protection up to six hours was obtained. When used in conjunction with zinc oxide, the time of protection is increased under certain conditions. Certain compositions containing benzyl ether also show a fair amount of repellent action against the *Anopheles quadrimaculatus* (malaria mosquito), but not nearly to so high a degree as against the other species named above.

Various types of compositions of benzyl ether incorporated into carriers can be used to good effect. Typical preparations contain benzyl ether as the essential active ingredient incorporated into lanolin, petrolatum or paraffin in varying amounts to form creams having a consistency to suit the climatic conditions under which the composition is to be used. Also, other materials may be added to vary the consistency. Second typical preparations contain benzyl ether incorporated into paraffin oil or vegetable oil such as cottonseed oil, olive oil, corn oil, peanut oil and the like to form lotions. Third typical preparations comprise a solution of benzyl ether in ethyl alcohol or glycerol of suitable dilution or any other suitable solvent which is harmless to the skin to form liquids. Fourth typical preparations contain benzyl ether incorporated into water to form emulsions by the use of emulsifying agents such as triethanolamine, together with other constituents if desired, to form lotions. Fifth typical preparations contain benzyl ether incorporated into zinc oxide or other inert powders to form dusting powders.

Zinc oxide may also be used with any of the named preparations and has the effect of lengthening the period of repellency.

The use of the compositions of this invention is not restricted to direct application to the skin. They may be applied to the animal body in other ways. For example, solutions in alcohol or in any other volatile solvent may be used to impregnate clothing, and a preparation in which benzyl ether is absorbed in an inert powder, such as talc, may be used as a dust directly on the skin, clothing or bedding.

Having thus described the invention, what is claimed is:

An insect repellent comprising benzyl ether as the essential active ingredient incorporated into zinc oxide.

SAMUEL I. GERTLER.

REFERENCES CITED

The following references are of record in the file of this patent:

UNITED STATES PATENTS

| Number | Name | Date |
|---|---|---|
| 1,755,178 | Grant | Apr. 22, 1930 |
| 1,845,059 | Sabalitschka | Feb. 16, 1932 |
| 2,420,271 | Travis et al. | May 6, 1947 |

FOREIGN PATENTS

| Number | Country | Date |
|---|---|---|
| 311,345 | Great Britain | 1930 |